United States Patent [19]
Parmentier et al.

[11] Patent Number: 5,792,358
[45] Date of Patent: Aug. 11, 1998

[54] METHOD FOR THE SEPARATION OF A HYDROPHOBIC LIQUID PHASE MELTED MEDIUM INTO HIGH AND LOW MELTING POINT FRACTIONS

[75] Inventors: Michel Parmentier, Vaudeville; Bernard Journet, Les Scey; Salina Bornaz, Ariana, all of France

[73] Assignee: Union Beurriere, S.A., Vesoul, France

[21] Appl. No.: 663,199

[22] PCT Filed: Dec. 9, 1994

[86] PCT No.: PCT/FR94/01448

§ 371 Date: Sep. 4, 1996

§ 102(e) Date: Sep. 4, 1996

[87] PCT Pub. No.: WO95/16012

PCT Pub. Date: Jun. 15, 1995

[30] Foreign Application Priority Data

Dec. 10, 1993 [FR] France ............... 93 15023

[51] Int. Cl.$^6$ ............................................. B01D 61/00
[52] U.S. Cl. .................... 210/651; 210/653; 210/805; 426/417; 426/601
[58] Field of Search ................. 210/650, 651, 210/653, 654, 195.2, 257.2, 805, 500.25, 500.36; 426/417, 601

[56] References Cited

U.S. PATENT DOCUMENTS

| 4,200,509 | 4/1980 | Seguine | 204/186 |
|---|---|---|---|
| 4,874,523 | 10/1989 | LaFreniere et al. | 210/652 |
| 5,006,229 | 4/1991 | Espenan | 210/321.89 |
| 5,066,504 | 11/1991 | Asbeck et al. | 210/417 |
| 5,084,183 | 1/1992 | LaFreniere et al. | 210/651 |
| 5,482,633 | 1/1996 | Muraldihara et al. | 426/417 |
| 5,525,144 | 6/1996 | Gollan | 210/321.81 |

FOREIGN PATENT DOCUMENTS

| 0 062 938 A1 | 10/1982 | European Pat. Off. . |
| 0 095 001 A1 | 11/1983 | European Pat. Off. . |
| 0 397 233 A3 | 11/1990 | European Pat. Off. . |
| 0 399 597 A3 | 11/1990 | European Pat. Off. . |

OTHER PUBLICATIONS

G. J. Miller et al., *Journal of Dairy Science*, "Rapid Extraction of Milk Fact[1]", vol. 64, pp. 1861–1862.

*Primary Examiner*—Ana Fortuna
*Attorney, Agent, or Firm*—Nilles & Nilles, S.C.

[57] ABSTRACT

A method for separating an oil or anhydrous fat in hydrophobic liquid phase into a high melting point fraction and a low melting point fraction. The method comprises a step of tangential flow filtration of oil or the anhydrous fat in hydrophilic liquid phase on a hydrophobic membrane to cause separation of the oil or anhydrous fat into a retentate constituting a high melting point fraction and an ultrafiltrate constituting a low melting point fraction. The method is useful for producing butter with hard or soft texture characteristics.

14 Claims, 3 Drawing Sheets

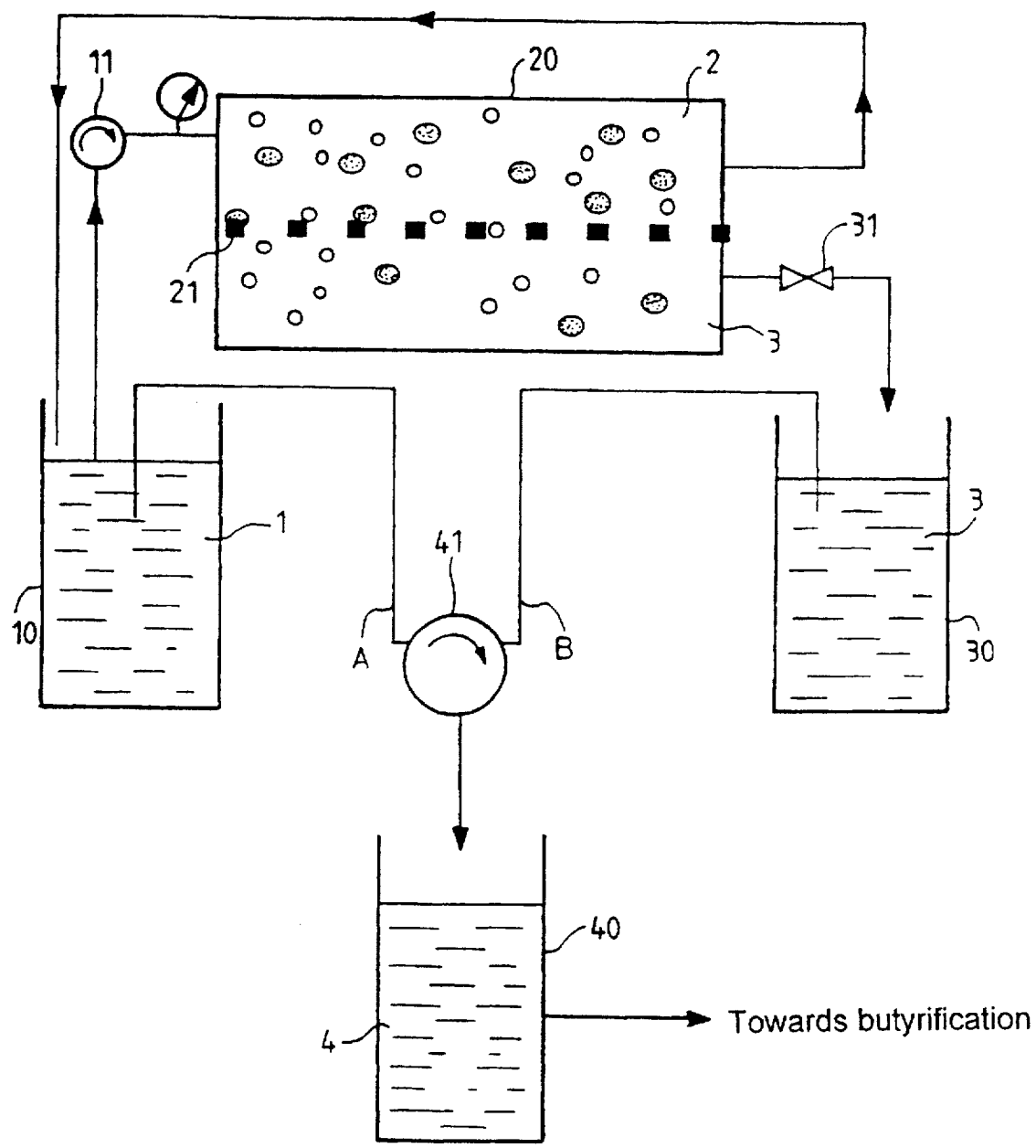
FIG_1
Towards butyrification

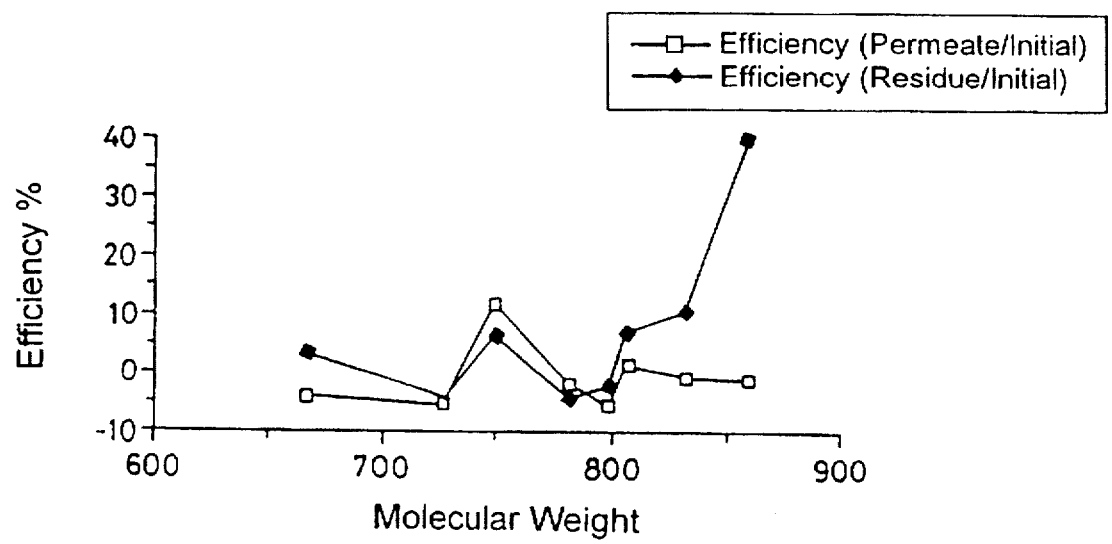
FIG_2a
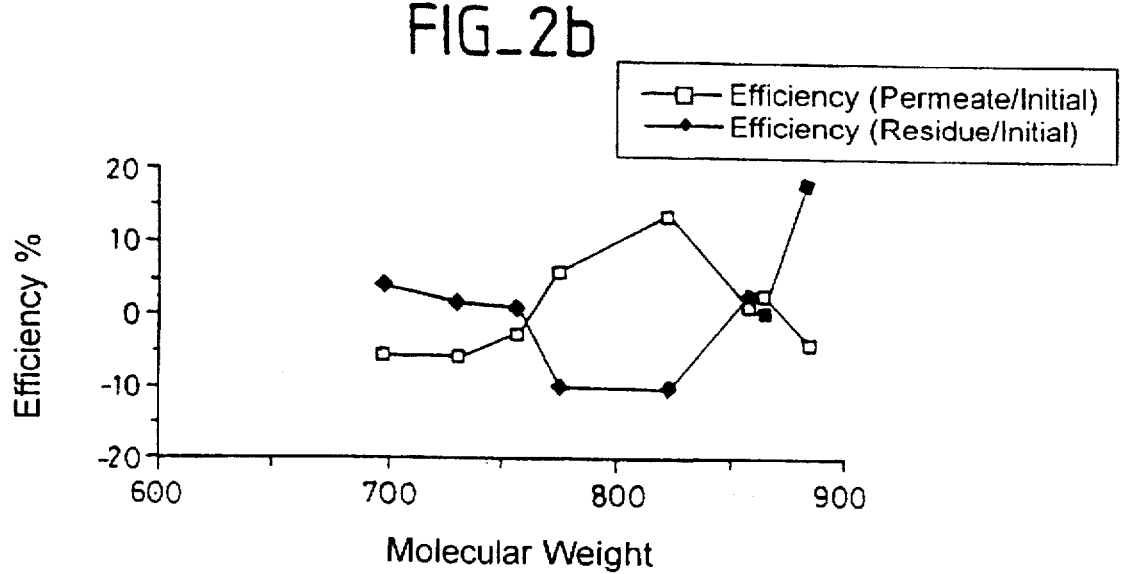
FIG_2b

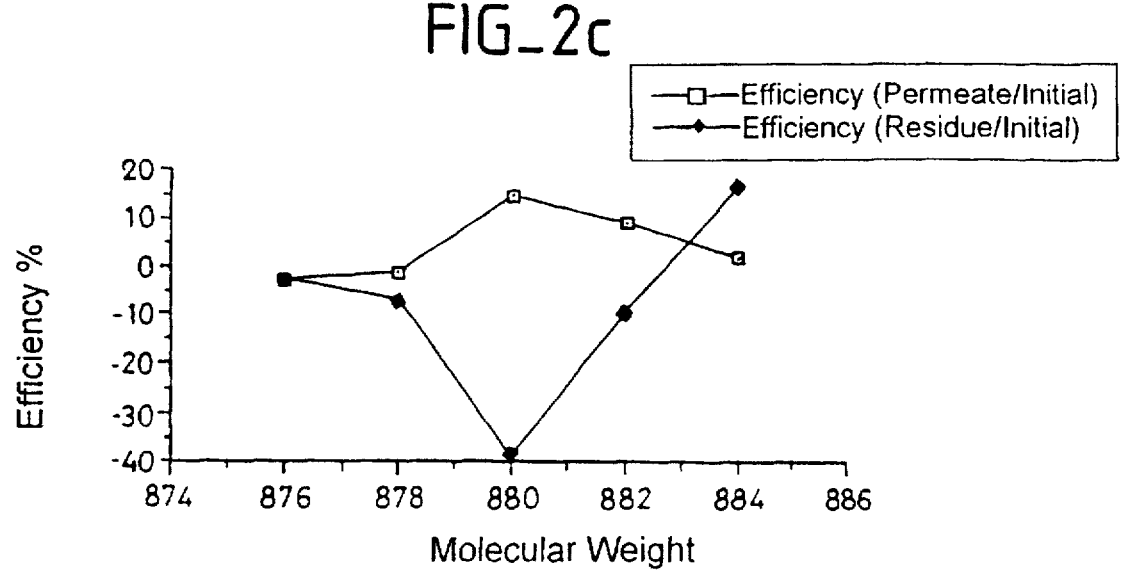
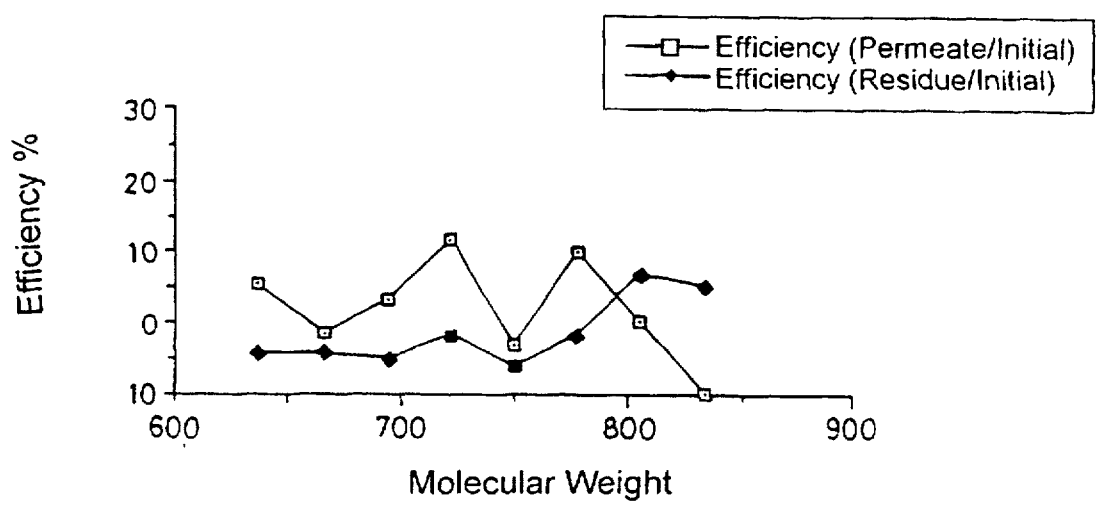

METHOD FOR THE SEPARATION OF A HYDROPHOBIC LIQUID PHASE MELTED MEDIUM INTO HIGH AND LOW MELTING POINT FRACTIONS

BACKGROUND OF THE INVENTION

The present invention relates to a method for the separation of an anhydrous oil or fatty substance in hydrophobic liquid phase into a high melting point fraction and a low melting point fraction. It also relates to a device for the implementation of this method.

The invention finds a particularly advantageous application in the manufacture of hard-textured or soft-textured butter.

In the following part of this paper, for reasons of simplicity, the term fatty substance shall be understood to mean an oil as well as a fat properly speaking.

In general, a fatty substance, whether it is of animal origin, such as a fat, or of vegetable origin, such as an oil, consists mainly of triesters of glycerol called triglycerides, the variety and composition of which determine its specific nature. As regards the hardness of the products obtained after butyrification by phase inversion, it is known that one of the preponderant factors is the ratio of the quantity of high melting point (HMP) triglycerides to the quantity of low melting point (LMP) triglycerides. This ratio is usually measured by the solid fat index or SFI which represents the quantity of solids, hence of crystallized triglycerides, at a given temperature. As for butter and margarine, the SFI (20) or solid fat index at 20° C. is well correlated with the hardness measured both by cone penetrometer and by the INSTRON (registered mark) testing machine. This SFI (20) may therefore serve as a technical goal for the preparation of butters or fats for specific uses, namely:

either when it is sought to obtain a softening that gives a better spreading quality to the substance, for example to improve this quality in winter butters;

or, on the contrary, when it is sought rather to have greater hardness at high temperature for technical reasons of use or to eliminate the appearance of a "greasy" finished structure, for example in pastry-making or and biscuit-making.

Up till now, the techniques enabling checks of this kind use two technologies:

a conventional technology based on heat treatment designed to modify the equilibrium between polymorphous phases in the crystallized fatty substance. These techniques make it possible to resolve some difficulties but are limited in range of variation. They cannot be used for example to fully compensate for the seasonal effect on the hardness of butters.

a more recent technology based on the cryogenic fractionation of a partially crystallized matter by filtration and/or centrifugation. The European patent application published under No. EP-A-397 233 describes a method for the separation of an anhydrous fatty substance into fractions by using this technology. However, this technique may be applied in the context of a pure anhydrous fatty substance such as for example anhydrous milk fat or AMF as well as in that of solutions of such fats or oils in generally polar solvents. The separation that follows the fractionating crystallization may use two technical approaches, namely simple filtration with centrifugation and filtration on semi-permeable membranes. The latter technique has been particularly recommended for specific separations in a solvent, with the aim for example of extracting a particular component from it or adding a particular component to it: for example cholesterol, phospholipids, etc.

This technology of cryofractionation can be used to obtain quite specific fractions but it makes use of heavy apparatus that is difficult to operate and gives finished products that are costly and highly differentiated with respect to the original matter, for example butter. To obtain a partial modification of the SFI in a butter, it is necessary to add significant quantities of high or low melting point fractions to it. Such an operation, which leads to the desired result in terms of texture, has the twofold drawback of heavily denaturing the fatty substance and of considerably increasing its cost.

OBJECTS AND SUMMARY OF THE INVENTION

The present invention therefore is aimed precisely at proposing a method for the separation of an anhydrous fatty substance in hydrophobic liquid phase into a high melting point fraction and a low melting point fraction that would enable the same performance to be obtained in terms of texture as with the known method of cryofractionation, but at a far lower cost and without causing deterioration in the fatty substance itself.

This aim is achieved, according to the invention, by the fact that said method comprises a step of tangential filtration of said anhydrous fatty substance in hydrophobic liquid phase on a hydrophobic membrane leading to the separation of said substance into a filtration residue constituting said high melting point fraction and a filtration permeate constituting said low melting point fraction.

The present invention can therefore be interpreted as a method for the enriching of one fraction, the permeate, in certain triglycerides, most of which have low melting points, at the same time as the other fraction, the residue, gets enriched with other triglycerides, most of them with high melting points. It must be noted that although most of the examples referred to in the present paper relate to butyric fat, the method according to the invention gives results that are also worthwhile in the field of animal or vegetable fats and oils.

The enriching of the fractions according to the separation method of the invention may consist of a simple disequilibrium that makes it possible to obtain, for example in the case of butter, either a harder butter from the residue or a softer butter from the permeate. To this end, the residue or the permeate obtained is mixed with a non-fatty substance and then subjected to a butyrification operation known per se. The enrichment however can be continued until a genuine fractionation is obtained if the recycling rate is high and the rate of extraction of permeate is low. To this end, it is planned that the residue will be reincorporated into the anhydrous fatty substance during filtration.

Thus, the method according to the invention makes it possible, using a melted anhydrous fatty substance such as an AMF at a fixed temperature, greater than 45° C., to obtain at will, at the end of the process, a butter with a characteristic either of winter butter or of summer butter. If the fractionation is intensified, it gives fatty substances with specific properties for special uses: milk products used as spreads, hard fatty substances, etc.

The method according to the invention is based on a separation entailing the molecular sorting of different types of triglyceride molecules according to their size, their radius of gyration in a hydrophobic liquid medium, their degree of saturation and therefore their rigidity. It therefore consists of a separation, by tangential filtration on a hydrophobic membrane, of lipid molecules in a liquid medium, for example a melted medium, that is totally hydrophobic. The fatty substance must be strictly anhydrous, as for example an AMF. It must remain melted, for example at a temperature of over 45° C. for an AMF, and free of any traces of water throughout the separation process.

The aim is to obtain separations of the same type and same effectiveness in a hydrophobic medium as those obtained in hydrophilic ultrafiltration on the water-soluble constituents of milk: this is obtained by completely reversing the direction of the interactions which are hydrophobic in nature in standard ultrafiltration in an aqueous medium. These interactions have an entirely hydrophobic character in the present method.

It must be stressed that water is particularly harmful to the method according to the invention for its presence in the fatty substance in liquid phase produces an emulsion at the membrane and leads to very swift clogging, causing a rise in the transmembrane pressure and a drop in the extraction rate.

The method of the invention can therefore be applied to fatty substances in liquid phase (oils that are at medium temperature or fats that are at a temperature above their melting point) which must be used without water, in order to obtain the most hydrophobic medium [in a medium and] on a hydrophobic membrane.

The membrane being used must have the greatest possible hydrophobic character. This is obtained for example from membranes made of sintered metal or by implementing highly hydrophobic polymers of the Teflon type among others.

The character of porosity of the membrane has a greater influence on the hydrodynamic conditions of operation (transmembrane pressure and flow rates) than on the efficiency and selectivity of the membrane. Indeed, in every case, the pore diameter (0.005 to 1.0 µm) is far greater than the radius of gyration of the molecules to be separated. The molecular sorting that takes place on the membrane is therefore due not only to a purely stearic and fluid effect: it is the result of the hydrophobic interaction between a particle and a membrane surface that is expressed in terms of differential adsorption on this surface, with a total effect of retention or transparency depending on the molecule considered.

Thus, an interaction of this kind depends both on the triglyceride molecule (size, nature of fatty acids, saturation, etc.) and on the membrane, through the hydrophobic interactions that it is capable of generating in contact with the molecule. Since these extremely complex interactions are not identical from one molecular to another, there ensues the desired phenomenon of separation.

It will furthermore be noted that the separation based on this type of hydrophobic interaction can advantageously be applied in fields others than that of the food industry and especially whenever the media affected by the separation are highly hydrophobic as for example in the case of mixtures of hydrocarbons coming either from the distillation of petrol or from residues with a view to depollution or value-added processing.

BRIEF DESCRIPTION OF THE DRAWINGS

The following description made with reference to the appended drawings which are given by way of nonrestricted examples will provide for a clear understanding of the content of the invention and the way in which it can be achieved.

FIG. 1 is a schematic drawing of a device for the implementation of the method according to the invention.

FIGS. 2a to 2d show graphs pertaining to the efficiency of the method of the invention for mono-, di-, tri-unsaturated triglycerides and for saturated triglycerides.

DETAILED DESCRIPTION OF THE PREFERRED EMBODIMENT

FIG. 1 gives a schematic view of a device for the implementation of a method of separation of an anhydrous fatty substance in hydrophobic liquid phase such as an AMF kept at a temperature greater than 45° C. in a starting tank 10 which, in the embodiment shown, also acts as a vessel 2 of recycled residue when it is reincorporated into the anhydrous fatty substance 1 during filtration. The AMF is sent by a pump 11 into a filtration membrane module 20 in which this fatty substance 1 undergoes tangential filtration on a hydrophobic membrane 21 which may be formed by a stack of several elementary membranes with a plane geometry as in FIG. 1. However, this particular membrane configuration is in no way imposed by the method that is an object of the invention and all types of plane or radial stacks may be used. The filtration membrane 21 is made of sintered metal, sintered stainless steel for example, or again of a hydrophobic polymer such as Teflon, (e.g. polytetrafluoroethylene) and has a porosity of 0.005 µm to 0.1 µm.

The tangential filtration produced in the module 20 separates the AMF into a residue 2 constituting a high melting point fraction that is recycled here into the tank 10 and a permeate 3 constituting a low melting point fraction that is extracted into a storage tank 30 through an adjustment valve 31 that enables the modification of the transmembrane pressure and hence the rate of extraction of the permeate 3.

The entire installation must imperatively be kept at a temperature at least equal to 45° C. in the example chosen and any presence of water in the circuit must be carefully avoided.

The Applicant has shown that with the process of the invention it is possible to obtain a residue 2 and a permeate 3 of SFI (20) respectively equal to 33 and 26 by means of the tangential filtration, for 30 minutes, of an AMF having a mean SFI (20) of 30.

The rest of the method is optional: in the channel A, the residue 2 stored in the tank 1 is sent by a second pump 41 into a mixing tank 40 where it is mixed with a non-fatty substance 4 and then cooled and textured in a standard butyrification installation, for example by the use of scraped surface heat exchangers. The butter obtained by the channel A is of the winter butter type with a "hard" texture while the channel B used in the same way leads to a summer type of butter with a "soft" texture.

Furthermore, it is important to note that the real measurable modifications of the composition of butyric fat are very low for a result of this kind: the substance is therefore always a butter. This is a very valuable feature from the marketing point of view.

Intermediate products in terms of textural properties may be obtained according to the present method with an appropriate mixture of the fraction in the channel A or B with a given initial fatty substance. Indeed, the conditions of control of tangential filtration (recycling rate, extraction rate) make it possible to arrive at fatty substances of varying degrees of differentiation that may range from simple disequilibrium in terms of SFI (20) up to genuine fractionation.

In view of the particular conditions of enrichment, the products obtained by the method according to the invention do not have the characteristic profile of known butters with added fractions, where the curve has shoulders at the high melting points. On the contrary, the profile of the thermogram of these products is similar to that of butter, with only the ratio of the surface area between HMP and LMP being different, this ratio being used for the computation of its SFI.

FIGS. 2a to 2d represent graphs of efficiency of the method according to the invention respectively for mono-, di-, tri-unsaturated and saturated triglycerides. Each of these graphs gives the proportion by which the residue and the permeate are enriched or depleted in triglycerides as a function of their molecular weight. This is a good indicator of the melting points so long as we remain with molecules having the same type of saturation.

We claim:

1. A method for the separation of an anhydrous fatty substance in hydrophobic liquid phase into a high melting point fraction and a low melting point fraction, wherein said method comprises a step of tangental filtration of said anhydrous fatty substance in hydrophobic liquid phase on a hydrophobic membrane leading to separation of said anhydrous fatty substance into a filtration residue constituting said high melting point fraction and a filtration permeate constituting said low melting point fractions wherein said step of tangental filtration is conducted above a melting point of said anhydrous fatty substance so that said anhydrous fatty substance is a melted medium during said step of tangental filtration.

2. A method according to claim 1, wherein said filtration residue is reincorporated into the anhydrous fatty substance in the course of filtration.

3. A method according to claim 1, wherein said filtration residue is mixed with a non-fatty substance and then subjected to a butyrification operation.

4. A method according to claim 1, wherein the filtration permeate is mixed with a non-fatty substance and then subjected to a butyrification operation.

5. Application of the method according to claim 1 to melted, anhydrous animal fats.

6. Application of the method according to claim 1 to melted, anhydrous vegetable fats.

7. Application of the method according to claim 1 to mineral oils.

8. The method of claim 1, wherein said step of tangental filtration is conducted at a temperature of over 45° C.

9. The method of claim 8, further comprising reincorporating said filtration residue into said source.

10. The method of claim 8, further comprising mixing said filtration residue with a non-fatty substance to form a mixture and subjecting said mixture to a butyrification operation.

11. The method of claim 8, further comprising mixing said filtration permeate with a non-fatty substance to form a mixture and subjecting said mixture to a butyrification operation.

12. The method of claim 8, wherein said performing is conducted at a temperature of over 45° C.

13. An application of the method of claim 8 to at least one member selected from the group consisting of anhydrous animal fats, anhydrous vegetable fats and mineral oils.

14. A method, comprising:

providing a hydrophobic membrane;

providing a source of an anhydrous fatty substance;

performing a tangental filtration of said anhydrous fatty substance in hydrophobic liquid phase on said hydrophobic membrane so as to separate said anhydrous fatty substance into a filtration residue including a high melting point fraction and a filtration permeate including a low melting point fraction, wherein said performing is conducted above a melting point of said anhydrous fatty substance so that said anhydrous fatty substance is melted medium during said performing.

* * * * *